United States Patent [19]

Haruta et al.

[11] Patent Number: 4,750,923
[45] Date of Patent: Jun. 14, 1988

[54] CANISTER FOR REDUCING FUEL VAPOR LOSS

[75] Inventors: Kazumi Haruta, Obu; Takashi Kato, Nagoya, both of Japan

[73] Assignee: Aisan Kogyo Kabushiki Kaisha, Ohbu, Japan

[21] Appl. No.: 927,720

[22] Filed: Nov. 7, 1986

[30] Foreign Application Priority Data

Nov. 8, 1985 [JP] Japan .......................... 60-172580[U]
Nov. 18, 1985 [JP] Japan .......................... 60-177273[U]

[51] Int. Cl.⁴ .......................................... B01D 53/04
[52] U.S. Cl. .................................... 55/319; 55/337; 55/387; 55/348
[58] Field of Search ............... 55/316, 319, 320, 321, 55/387, 418, 419, 337, 344, 399, 348, 184, 185, 447, 456, 457; 123/518-521

[56] References Cited

U.S. PATENT DOCUMENTS

| | | | |
|---|---|---|---|
| 2,511,190 | 6/1950 | Wright | 55/447 X |
| 2,850,363 | 9/1958 | Johnig | 55/457 X |
| 3,378,993 | 4/1968 | Veres et al. | 55/337 X |
| 3,461,652 | 8/1969 | Sato | 55/457 X |
| 3,483,677 | 12/1969 | Pinto | 55/316 |
| 3,530,649 | 9/1970 | Porsch et al. | 55/316 |
| 3,641,745 | 2/1972 | Moore | 55/457 X |
| 3,685,971 | 8/1972 | Carson | 55/387 X |
| 4,173,458 | 11/1979 | Stiles | 55/457 X |
| 4,263,025 | 4/1981 | Modare | 55/185 |
| 4,308,840 | 1/1982 | Hiramatsu et al. | 123/519 |
| 4,318,368 | 3/1982 | Carson et al. | 55/348 X |
| 4,331,120 | 5/1982 | Hiramatu et al. | 123/519 |
| 4,350,505 | 9/1982 | Malloy et al. | 55/418 X |
| 4,448,594 | 5/1984 | Kozawa | 55/387 |
| 4,507,132 | 3/1985 | Yoshida | 55/320 |
| 4,559,068 | 12/1985 | Lagerstedt et al. | 55/399 |

FOREIGN PATENT DOCUMENTS

| | | |
|---|---|---|
| 0033062 | 10/1972 | Japan . |
| 0123953 | 8/1982 | Japan . |
| 0009077 | 3/1984 | Japan . |
| 0284221 | 2/1928 | United Kingdom .................. 55/316 |

*Primary Examiner*—Charles Hart
*Attorney, Agent, or Firm*—Cushman, Darby & Cushman

[57] ABSTRACT

A canister for adsorbing fuel vapor overflowing a fuel tank of an internal combustion engine and purging adsorbed vapor under a negative pressure of the suction system of the internal combustion engine so as to supply this adsorbed vapor for the combustion, the canister having a deflector for spirally diffusing introduced fuel vapor throughout the adsorbent layers of the canister, and another deflector having apertures for diffusing introduced purging air throughout the adsorbent layers.

1 Claim, 2 Drawing Sheets

CANISTER FOR REDUCING FUEL VAPOR LOSS

BACKGROUND OF THE INVENTION

This invention relates to a canister for reducing the loss of vaporizing fuel.

A canister having a fuel vapor inlet port and a purge port on one side of a chamber accommodating activated carbon and an atmospheric air port on the other side has been conventionally used as an apparatus for reducing fuel vapor loss which contains activated carbon for adsorbing fuel vapor generated in such portions of a fuel system as a fuel tank during the shut-down state of an engine and which supplies the adsorbed fuel vapor to the engine when the operation of the engine recommences.

It is important for this type of canister to diffuse the fuel vapor which is to be adsorbed over the entire region of an activated carbon chamber in order to increase the efficiency of adsorption and separate the adsorbed fuel vapor from the adsorbent as completely as possible so as to increase the efficiency of readsorption.

In this respect, means for diffusing fuel vapor by using a baffle plate having apertures disposed in a fuel vapor passage have been proposed, as disclosed in Japanese Utility Model Examined Publication No. 9077/1984 and Japanese Utility Model Unexamined Publication No. 12395/1982.

On the other hand, means for separating adsorbed fuel from an adsorbent and having a suitable gap between the adsorbent layers and the atmospheric air port to ensure that the atmospheric air introduced from the atmospheric air port flows through this gap into the adsorbent layers have been previously proposed, as disclosed in Japanese Utility Model Examined Publication No. 33062/1972 and Japanese Utility Model Unexamined Publication No. 123953/1982.

It is an object of the present invention to improve the conventional type of such a canister with respect to the efficiency of fuel vapor adsorption by an adsorbent and the efficiency of purging from the adsorbent. To this end, the present invention provides a canister comprising a first deflector for improving the diffusion of fuel vapor by effecting swirling movement of the vapor flowing into the canister, and a second deflector for distributing throughout the canister the air which flows toward the canister for purging the vapor.

Other and further objects, features and advantages of the invention will appear more fully from the following description.

BRIEF DESCRIPTION OF THE DRAWINGS

The accompanying drawings show preferred embodiments of the present invention.

DETAILED DESCRIPTION OF THE PREFERRED EMBODIMENTS

Preferred embodiments of the present invention will be described hereinafter with reference to the accompanying drawings.

Figure 1:
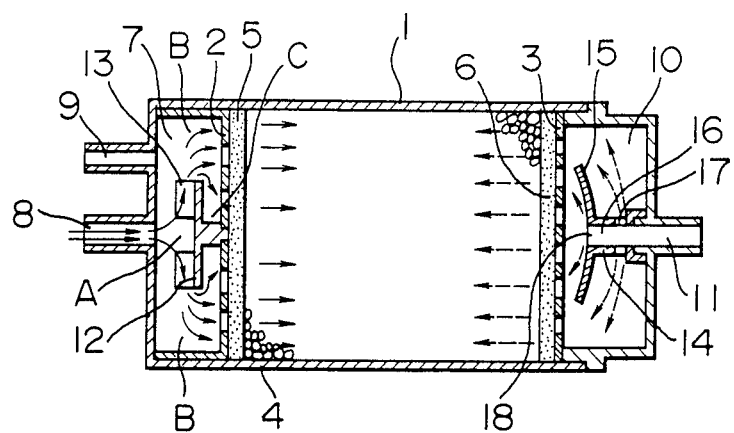
FIG. 1 is a sectional side view of an embodiment of the present invention.
Figure 2:
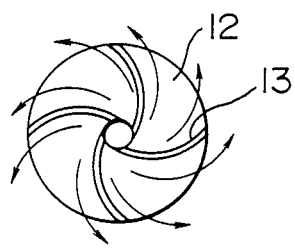
FIG. 2 is an illustration of the surface of a first diffusing plate.

FIG. 1 shows the arrangement of a canister which has a cylindrical casing 1, a pair of separation walls 2 and 3 having a multiplicity of apertures disposed and fixed on the opposite sides of the inner space of the casing 1, and an adsorbent 4 such as activated carbon packed between the separation walls 2 and 3 with filters 5 and 6 each of which is interposed between the walls and the adsorbent. An inflow chamber 7 is adjacently formed on the outside of the separation wall 2. A fuel vapor inlet port 8 and a purge port 9 are open to the internal space of the inflow chamber 7. The fuel vapor inlet port 8 for supplying fuel vapor is communicated with a fuel tank at the top thereof, and the purge port 9 is communicated with a suction system of an internal combustion engine. On the outside of the separation wall 3 is adjacently formed a cylindrical diffusion chamber 10 which is open at the center of its outer wall through an atmospheric air port 11.

Figure 3:
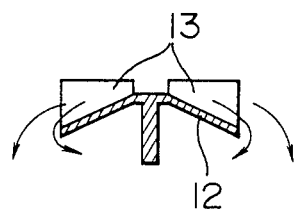
FIG. 3 is a sectional side view of another example of the first diffusing plate.
Figure 4:
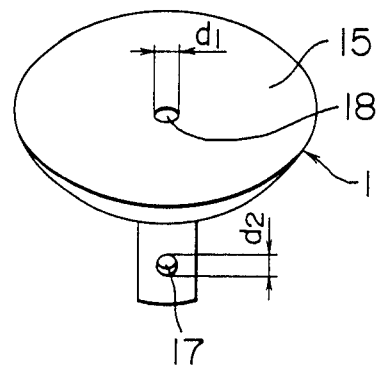
FIG. 4 is a perspective view of a diffusing member.

A diffusing plate 12 is disposed in the inflow chamber 7, the axial portion of this diffusing plate being fixingly embedded in the separation wall 2. The diffusing plate 12 is provided in the form of a disk having a diameter smaller than that of the casing 1 so that a flow communication region B is formed between the outer peripheral end of the diffusing plate and the inner peripheral surface of the inflow chamber 7. The diffusing plate 12 is so disposed that the center thereof is aligned with the fuel vapor inlet port 8 and that flow communication spaces A and C are formed on the front and rear sides of the diffusing plate 12. On a surface of the diffusing plate 12 which faces the port 8, a plurality of circular-arc vanes 13 are rigidly disposed with equal intervals in the peripheral direction of the diffusing plate. The diffusing plate 12 may be formed in a flat plane such as is shown in FIG. 1, or the shape of a flat cone, as shown in FIG. 3.

On the other hand, a diffusing member 14 which is disposed in the diffusion chamber 10 is fixedly connected to the atmospheric air port 11 at its base portion and has at its top end a dish-like diffusing plate 15 whose concave surface faces the side of the adsorbent layers. The diffusing member 14 also has an atmospheric air passage 16 formed in its base portion so as to be communicated with the atmospheric air port 11, a plurality of vent holes 17 disposed in the peripheral direction and open at an intermediate portion of the passage 16, and a vent hole 18 open at the center of the diffusing plate 15. The vent holes 17 and 18 provide communication between the atmospheric air passage 16 and the diffusion chamber 10. The aperture $d_2$ of each vent hole 17 is smaller than the aperture $d_1$ of the vent hole 18.

Figure 5:
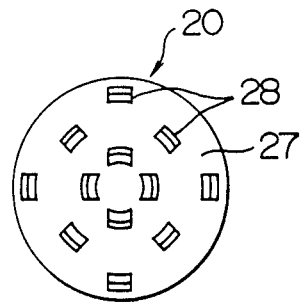
FIG. 5 is a front view of a second example of the diffusing member.
Figure 6:
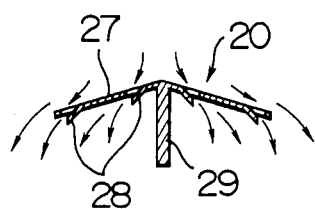
FIG. 6 is a sectional side view of the same.

FIGS. 5 to 8 show modifications of the diffusing member 14 of the above-described embodiment. As shown in FIGS. 5 and 6, a plurality of deflecting pieces 28 are formed by cutting and raising portions of a diffusing plate 27 in the form of a cone-shaped dish so that they are disposed with suitable intervals and project outwardly in the radial direction on the downstream side thereof, and a pillar 29 is disposed on the reverse side of the diffusing plate 27 at the center thereof, thus constituting a diffusing member 20. The pillar 29 is fixed on the separation wall 3. The diffusing member 20 is thereby disposed in the diffusion chamber 10 so that the top of the diffusion plate 27 faces the atmospheric air port 11. By the effect of this arrangement, atmospheric air introduced through the atmospheric air port 11 is diffused outwardly on the surface of the diffusing plate 27, and, simultaneously, part of this atmospheric air is uniformly diffused by the deflecting pieces 28 to the reverse side of the diffusing plate 27.

Figure 7:
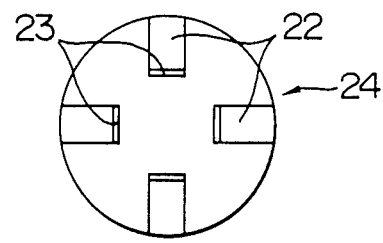
FIG. 7 is a front view of a third example of the diffusing member.
Figure 8:
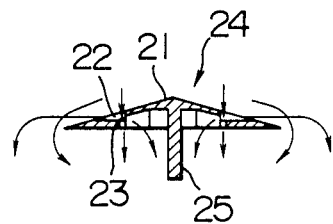
FIG. 8 is a sectional side elevation of the same.

FIGS. 7 and 8 show a another example of the diffusing member: a diffusing member 24 in which a diffusing plate 21 in the form of a flat cone is provided with a plurality of radially disposed recesses 22 and a through hole 23 formed in an inner wall of each of these recess 22. This diffusing member 24 is fixed at its pillar 25 to the separation wall 3 in the same manner as described above in the case of the diffusing member 20. Atmospheric air introduced through the atmospheric air port 11 is diffused outwardly on the surface of the diffusing plate 21, and, simultaneously, part of this atmospheric air is uniformly diffused by the through hole 23 to the reverse side of the diffusing plate 21.

The canister in accordance with the present invention functions as follows.

Fuel vapor which generates in the fuel tank, etc., during the shut-down state of the engine flows into the inflow chamber 7 through the fuel vapor inlet port 8, and then collides against the surface of the diffusing plate 12 at the center thereof so that the fuel vapor is diffused outwardly in the radial direction toward the outer periphery of the diffusing plate. At this time, the fuel vapor flows while being swirled by the vanes 13 formed on the diffusing plate 12. It swirls in the form of a vortex in the inflow chamber 7 and diffuses over the entire region thereof. The fuel vapor introduced is thus distributed over the entire area of one end surface of the adsorbent layers 4, and it flows into the adsorbent layers 4 and flows therethrough while also swirling. Therefore, the adsorbing effect in the adsorbent layers 4 is improved.

In addition, the atmospheric air which has been drawn by a negative pressure at the purge port 9 and flowed in through the atmospheric air port is uniformly distributed throughout the diffusion chamber by the effect of the diffusing member and it flows into the adsorbent layers via any portions on the atmospheric-air-inflow side thereof. Thus, the atmospheric air for purging acts uniformly on the entire adsorbent.

What is claimed is:

1. A canister for preventing fuel vapor loss of an internal combustion engine, having on its one side a fuel vapor inlet port communicated with a fuel tank so as to introduce fuel vapor into said canister, and a purge port communicated with a suction system of said internal combustion engine so as to supply the same with fuel vapor adsorbed in said canister, said canister having on the other side an atmospheric air port for introducing atmospheric air to purge adsorbed fuel vapor, said canister being packed with adsorbent layers, said canister comprising:

a space formed between said fuel vapor inlet port and said adsorbent layers;

a first deflector for effecting spiral movement of fuel vapor flowing into said space through said inlet port in the axial direction of said canister, said spiral movement being effected outwardly in the radial direction toward the outer periphery of said first deflector, so that fuel vapor is diffused over the entire cross-sectional area of said adsorbent layers;

said first deflector including a plurality of guide vanes spirally extending outwardly in the radial direction;

a second space located between said atmospheric air port and said layers, said canister further including a second deflector for defusing fuel vapor flowing into said second space through said atmospheric air port in the axial direction of said canister, over the entire cross-sectional area of said adsorbent layers.

* * * * *